UNITED STATES PATENT OFFICE.

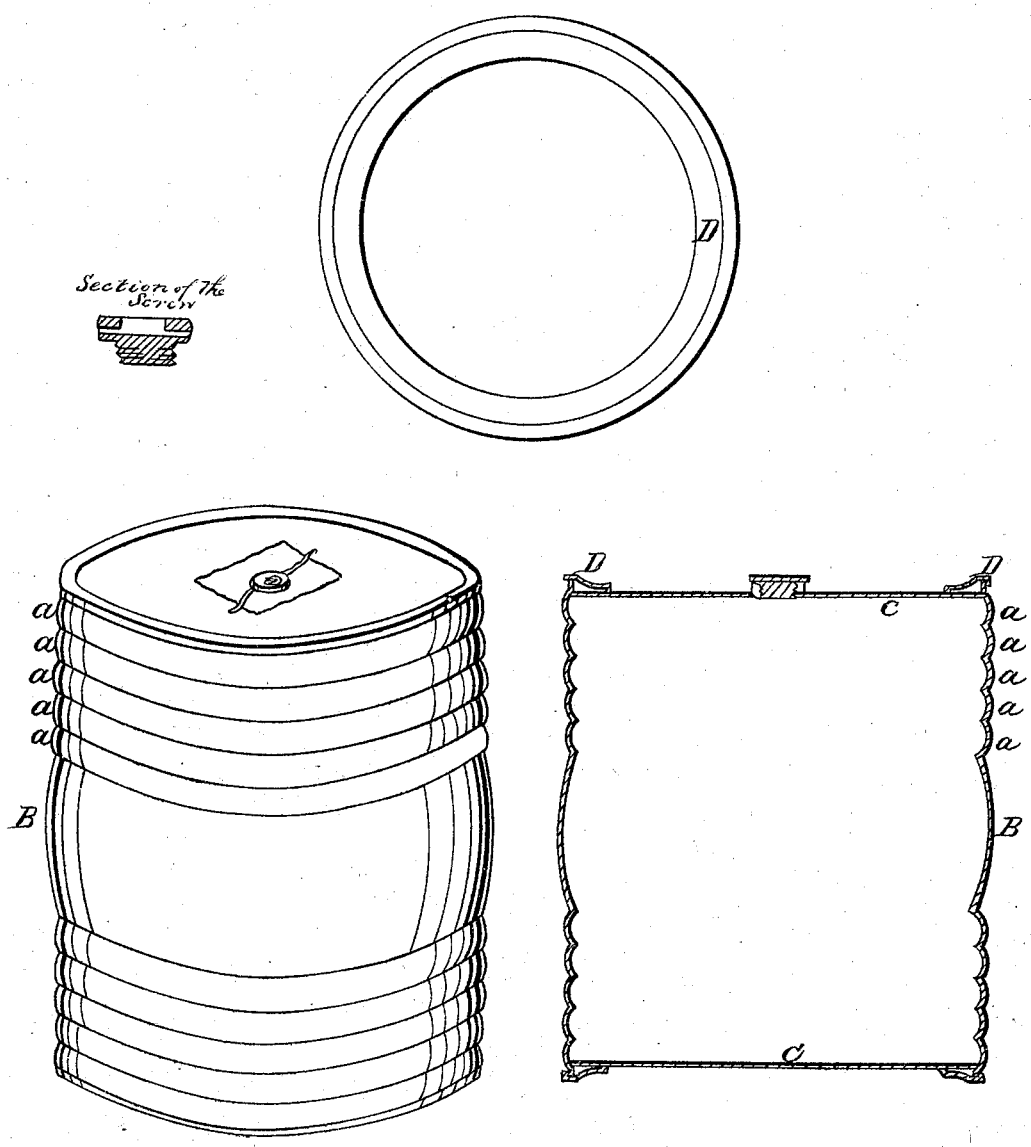

JAS. WILSON, CHS. GREEN, AND WM. WILSON, JR., OF BRANDYWINE, DEL.

IMPROVED GUNPOWDER-KEG.

Specification forming part of Letters Patent No. 16,944, dated March 31, 1857.

*To all whom it may concern:*

Be it known that we, JAMES WILSON, CHARLES GREEN, and WILLIAM WILSON, Jr., of Brandywine, in the county of New Castle and the State of Delaware, have invented certain new and useful Improvements in Gunpowder-Kegs made of Metal; and we do hereby declare that the following is a full, clear, and exact description of the same, reference being had to the accompanying drawing, forming a part of this specification.

The means of safe-keeping and a secure mode of retaining gunpowder has long been a desideratum. In the article we present for that purpose this object is now attained with economy of the vessel employed, with greater strength thereof than hitherto, with almost absolute certainty that the powder can suffer no change, either from dampness or being tampered with, and the great additional advantage of security from accidental explosion of the filled kegs.

To enable others skilled in the art to make and use our improvements, we would describe them as follows:

First, in forming the body of the keg we solder the ends of the sheet and form a plain cylinder; then we corrugate it by the use of two rollers, one of them with convex projections, and a swell thereon to correspond with $a\ a\ a\ a$, the hoops, and B the swell or bulge, the other roller being a match one to serve as a seat or die. Then cut out the plain heads C, with shears or otherwise, and stamp up the extra chine D by means of a die and socket. Take one-half the number of heads and punch a hole therein for the screw. The punch is so formed as to produce a slight recess for the metal of the screw. Place in the hole a mandrel, with a male screw cut thereon, and a slight distance surround it with a temporarily-placed ring, between which and the mandrel the melted metal is poured, forming a nut or female screw which readily unites with the tin head. The heads and extra chine are now properly soldered to the body of the keg, a screw-stopper made and fitted to the nut, and the keg is finished.

In manufacturing kegs and barrels of tin we have found it best to cut the piece for the head of sufficient diameter to allow of the ring D being cut therefrom—for instance, in a head of four inches and a ring of half an inch in width we cut the piece five inches in diameter, then cut the ring off, which leaves the head of a proper size. A small section of the ring is then cut out, the ends united by soldering form a dishing ring, ready for a stamping-die, to make it fit the head and form a lip to cover the edge of the corrugated cylinder. By running solder at its junctions with said cylinder and head it is united therewith.

We have found that these kegs often can be made at a less cost than of wood covered with painted canvas, now employed, while they offer great advantages in securing powder from dampness, leakage, &c.

We do not claim the mere giving strength to metal by corrugating it, as that effect is well known; but What we do claim as our invention, and desire to secure by Letters Patent in the manufacture of metal kegs or barrels for holding gunpowder, is—

The making the sides or cylinder of corrugations $a\ a\ a$, and bulge or swell B, when employed with the extra ring or boss D, and head C, for the purpose of greater strength and more convenient handling, as set forth.

In testimony whereof we have hereunto signed our names before two witnesses.

JAMES WILSON.
CHARLES GREEN.
WM. WILSON, JR.

Witnesses:
JOSEPH WALKER,
JOHN E. BEATTY.